FIG.1
FIG.2
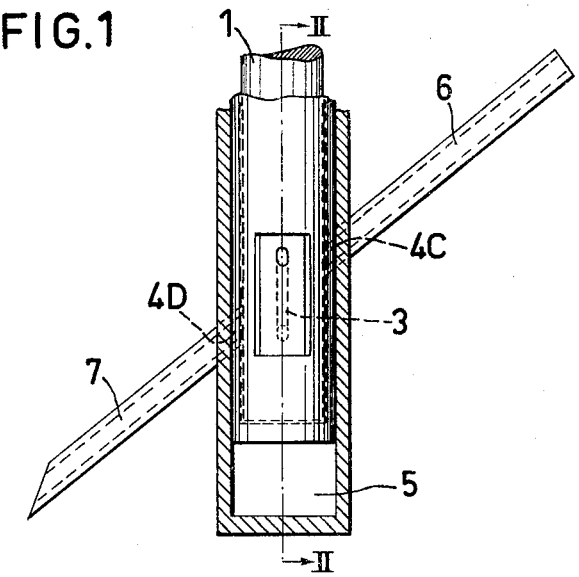
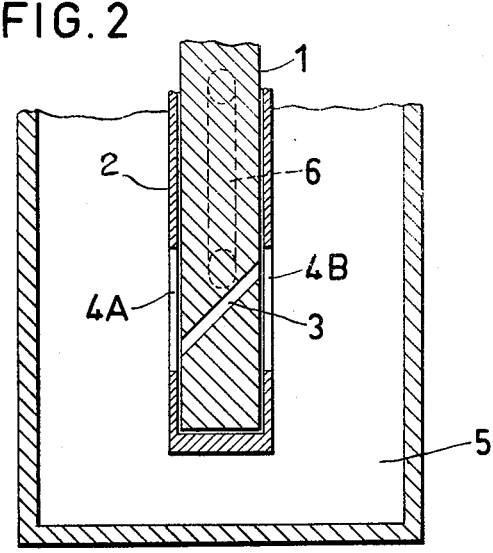

United States Patent Office 3,209,959
Patented Oct. 5, 1965

3,209,959
DISPENSING DEVICE
Kjell Agner, 7 Mariebergsgatan, Stockholm, Sweden
Filed Mar. 8, 1963, Ser. No. 263,951
Claims priority, application Sweden, Mar. 10, 1962,
2,683/62
1 Claim. (Cl. 222—367)

This invention relates to a dispensing device, particularly of the type adapted for metering liquids and transferring the metered liquid quantity from a stock vessel to a receiving vessel.

In laboratories the metering of definite liquid quantities was heretofore carried out substantially manually by means of a pipette or a burette. To some extent technical auxiliary equipment was employed. These apparatus were generally constructed such, that pressure above or below atmospheric pressure was applied for pressing liquid up or sucking it into a syringe with movable piston or into another container adapted to expand to a certain definite volume. When the syringe was filled to the volume in question, the associated piston was pressed back into the syringe. For directing the liquid flow from the supply to the syringe, and in a later phase from the syringe to a collecting vessel, a solenoid or a mechanical valve or another mechanical stopper, for example a specially devised stopcock was provided. Dispensing by manually operated equipment proved both time-wasting and tedious, particularly when extensive test series had to be performed. Moreover, in many cases the metering suffered from inaccuracy, particularly in the final phase of the test series.

The invention has as its object to eliminate the aforesaid shortcomings and to produce a device rendering it possible to dispense liquids and free-flowing powders in a simple and rapid manner. The dispensing device according to the invention is characterized in that it includes a shaft with circular cross-section adapted to be rotated and sealingly enclosed in a housing. The said shaft is provided with a hole the size of which is determined by and corresponds to the quantity to be metered. The said hole is in two places open relative to the housing. The housing is provided with four holes arranged such, that in different positions of the shaft two of said holes fill the hole through the openings in the housing, and that two openings are intended for emptying the hole. In its most simple design, the hole in the shaft may be an angular passage. The said hole shall be inclined to the horizontal plane. The housing is immersed and secured in a stock vessel, in such a manner, that at a certain position of the shaft the contents of the vessel is brought into connection with the hole by way of the two fill openings in the housing. The housing is preferably so secured in the stock vessel, that the consumption of liquid does not cause displacement with respect to the relative height of the liquid levels in different parts of the vessel, for example by free communication between the different parts of the stock vessel.

The dispensing device according to the invention will be described in the following in greater detail, reference being had to the accompanying drawing, whereon FIG. 1 shows in section a preferred embodiment of the invention, and FIG. 2 shows in section a view along the section line 2—2 in FIG. 1.

The dispensing device according to the invention comprises a shaft 1 with circular cross-section adapted to be rotated and sealingly enclosed in a housing 2. The said housing which is immersed and secured in a vessel 5 is provided with four (two pairs) openings 4A, 4B, 4C and 4D. Two openings thereof, 4A and 4B, communicate according to FIG. 2 with the stock vessel 5. The remaining two openings, 4C and 4D, are placed at different heights in two of the opposite walls of the housing. As appears from FIG. 1, the said openings 4C and 4D open into two extension tubes 6 and 7. The shaft 1 is provided with a hole 3 in the form of an angular passage having such inclination relative to the horizontal plane, that at a certain position of shaft 1 the passage effects connection between the two openings 4C and 4D in the housing 2 and thus also between the extension tubes 6 and 7.

Referring to the embodiment shown in FIGS. 1 and 2, the dispensing device according to the invention operates as follows. The shaft 1 is rotated by a suitable drive means, for example an electromotor. The substance to be dispensed, preferably a liquid, is filled into the vessel 5 where it is preferably maintained by suitable means on a level above the openings 4A and 4B. Compressed air is applied at the upper end of tube 6. Upon rotation of shaft 1, the hole 3 is filled with the substance in the position shown in FIG. 2, in that the air in the passage is displaced by the substance and goes off to the right in FIG. 2. During continued rotation of shaft 1, the hole 3 assumes the position connecting the hole 3 with the tubes 6 and 7. The compressed air applied blows the substance out through the tube 7. Below tube 7, there is provided one of the packings, vessels, containers, for example test tubes or flasks, wherein the substance is supposed to be used. The said container may be placed below the tube 7 either manually or in a mechanical automatic way. During the continued rotation of shaft 1, the said steps are repeated.

It is, of course, not necessary to employ compressed air for blowing the substance out. The substance may, for example, flow out by its own gravity. The hole 3 may be given any cross-section and need not pass entirely across the shaft. It is, however, of importance that no pockets can form in the hole, thus enabling air or possibly another gas used for or entering during the displacement of the substance to remain in the hole while the substance is being filled in. The volume of hole 3 is adjusted according to the quantity of substance to be dispensed. For changing the volume to be dispensed, shaft 1 may be exchanged, but preferably another apparatus adjusted to the volume intended to be dispensed is used. The substance to be dispensed may be any liquid, but too viscous liquids are unsuitable. The substance may also be free-flowing powder.

What I claim is:

A dispensing device comprising a housing, a shaft with circular cross-section adapted to be rotated and sealingly enclosed in said housing, the said shaft provided with a hole, having a capacity corresponding to the volume to be dispensed, said hole being open at two places relative to said housing, said housing provided with four openings of such arrangement, that at different positions of the shaft they communicate with the said hole of said shaft, two of said openings serving as fill openings for the hole and two other openings serving for emptying said hole, a vessel in which said housing is located with which vessel said hole communicates by way of the said two fill holes in the housing and said hole being inclined relative to the horizontal plane.

References Cited by the Examiner
UNITED STATES PATENTS
559,386    5/96    Jones _____ 222—276

LOUIS J. DEMBO, Primary Examiner.

SAMUEL F. COLEMAN, Examiner.